Jan. 12, 1937.  W. C. CORYELL  2,067,313
PROCESS OF FORMING SLAG BLOCKS
Original Filed June 29, 1933   2 Sheets-Sheet 1
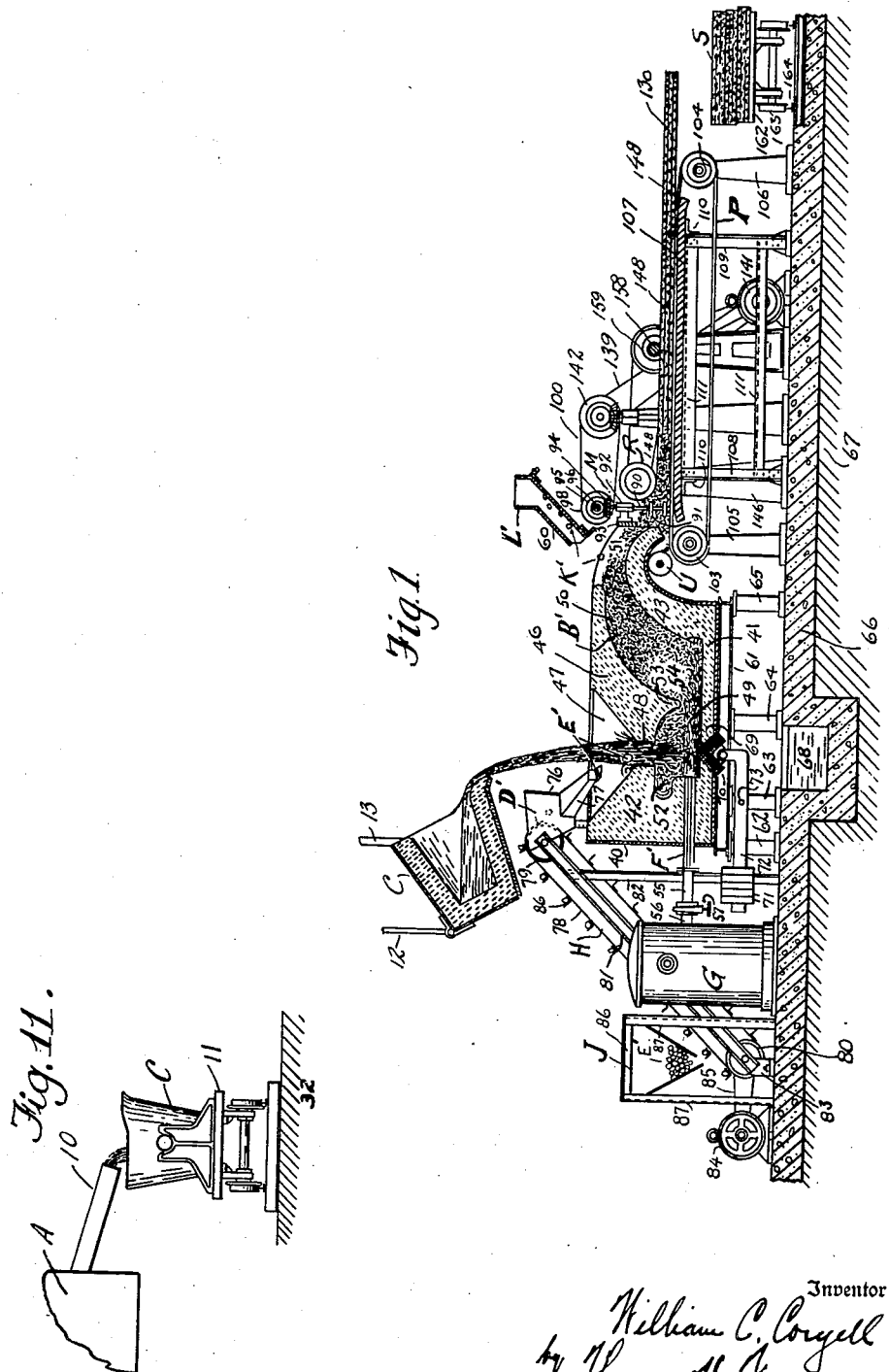
Inventor
William C. Coryell
by Thomas H. Ferguson
Attorney Jan. 12, 1937. W. C. CORYELL 2,067,313
PROCESS OF FORMING SLAG BLOCKS
Original Filed June 29, 1933 2 Sheets-Sheet 2
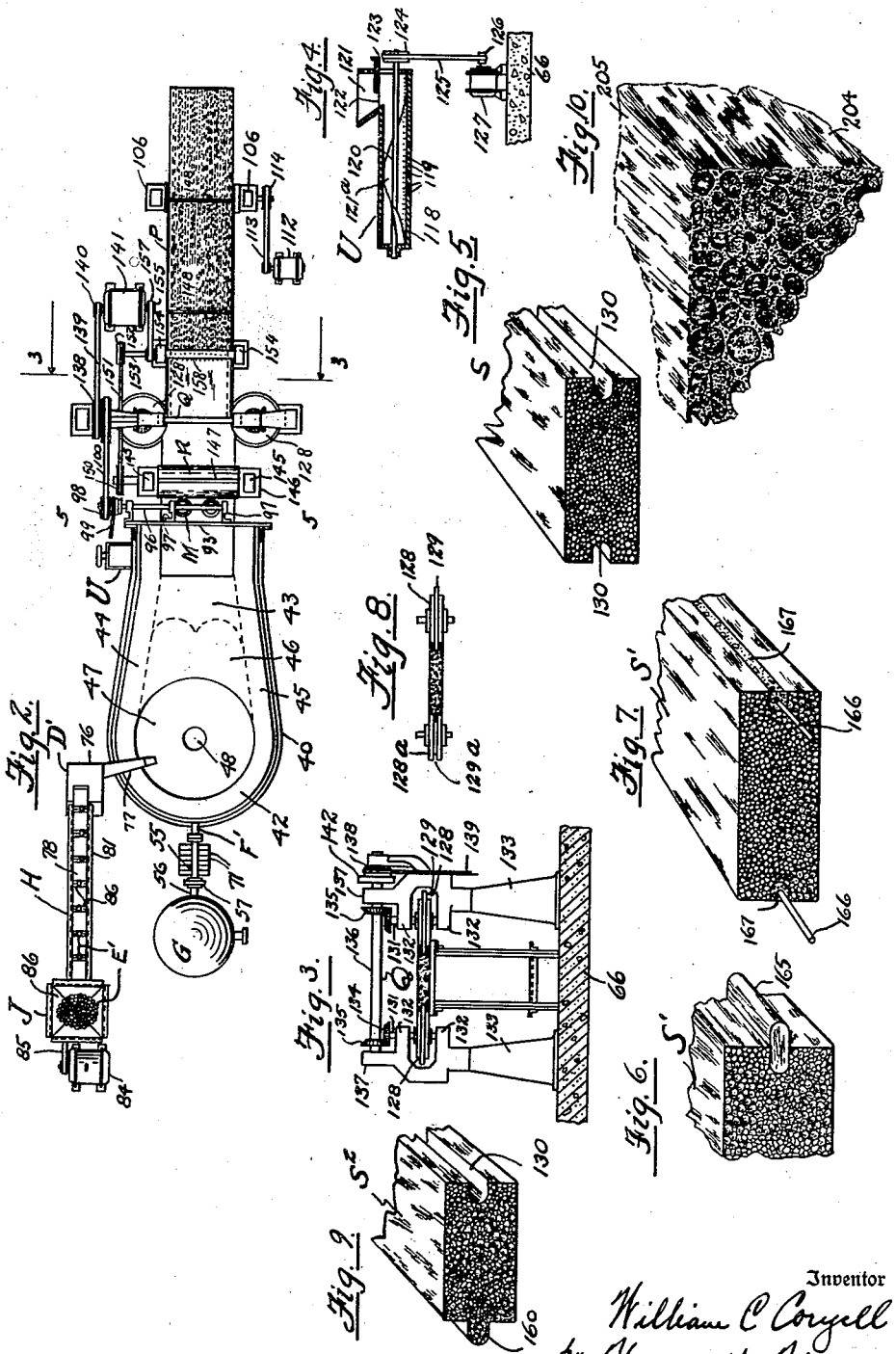
Inventor
William C Coryell
by Thomas H. Ferguson
Attorney Patented Jan. 12, 1937

2,067,313

UNITED STATES PATENT OFFICE 2,067,313

PROCESS OF FORMING SLAG BLOCKS

William C. Coryell, Youngstown, Ohio

Original application June 29, 1933, Serial No. 678,251. Divided and this application May 31, 1935, Serial No. 24,319

3 Claims. (Cl. 49—77.5)

This application contemplates dealing with a molten slag mass and passing the slag as a stream between forming elements which shape the slag to a given cross-section and then, in some cases, breaking off slabs or blocks at the cooling end of the stream as the same advances. It also contemplates tongueing and grooving the edges of the block. In some instances this may be done by forming grooves in both edges and then placing a separate strip in one of the grooves and extending it outward far enough to provide the tongue. In other instances the tongue may be formed at the time of forming the block. Again the bar or bars inserted within the groove or grooves of the block will serve as reinforcing bars for the product block or slab. The surfaces of the block or slab may also be roughed during the forming steps so as to suit the same to the receiving of mortar or the like for plastered surfaces. They may be also treated so as to close over the cellular formations and thus provide a more or less continuous and unbroken surface. These and other like novel steps and products follow in the wake of the new process.

One object of the invention is to provide a quick and continuous process for forming the slag or its equivalent while in a more or less hot viscous state, and to this end a slag mass is passed from the mixer along a continuous path and treated at different points in its travel. Preferably the travel of the mass is continuous or practically so.

Another object is to form the edges of the advancing slag slab in a definite way, as, for example, flat, or one with a tongue and the other with a groove, or both with grooves. In the latter case a tongue member of similar or quite different material may be inserted in the one groove to provide a tongued and grooved product.

Another object is to provide a novel way of breaking off the end blocks or pieces from the advancing end of the slab. This is preferably done by transversely creasing the slab on its upper side while it is in a more or less plastic condition and then when it cools breaking off the end in advance of the last crease. The weight of the block may be relied upon to do this breaking along the adjacent crease line, or the same may be broken off in any other desired way.

Another object is to give the surfaces of the finished product a more or less rough yet continuous and unbroken finish. This is preferably done by raking the advancing molten slab after it leaves the forming elements by which the cross-section is determined. The raking opens up the cells at and near the surface of the viscous material of the slab and causes the adjacent material to come together to provide a rough yet fairly continuous and unbroken surface suitable for the adhesion of a coat of plaster or the like.

These various features and advantages of the invention, together with others, will be more fully understood upon reference to the following detailed description taken in connection with the accompanying drawings while the scope of the invention will be particularly pointed out in the appended claims.

The present application is a division of my prior application Serial No. 678,251, filed June 29, 1933. Said prior application has to do more particularly with the method of bloating the slag mass. This case has to do, not with the bloating, but with the forming of the same into slabs or blocks.

In said drawings, Fig. 1 is a diagrammatic view partly in section illustrating the method of the invention and suitable apparatus for carrying out the method; Fig. 2 is a plan view of the apparatus illustrated in Fig. 1; Fig. 3 is a view mostly in elevation of the edge forming mechanism by which the grooves are placed in the edge of the slab as it travels along, the few parts in section being cut on a plane indicated by the line 3—3 of Fig. 2; Fig. 4 is a similar view of suitable mechanism for placing sand, or the equivalent, upon the conveyor as it is about to receive the molten slag from the mixing chamber of the apparatus; Fig. 5 is a perspective view of a portion of a block formed according to the present method and having suitable grooves in its edges; Fig. 6 is a similar view of the same block with a tongue member inserted in one of the grooves; Fig. 7 is a similar view of the grooved block showing metal reinforcing bars or rods cemented into the two grooves; Fig. 8 is an elevation of the edge wheels necessary when both a tongue and groove are to be formed at the time of shaping and molding the issuing slab web; Fig. 9 is a perspective view of a portion of a block made after the manner illustrated in Fig. 8; Fig. 10 is a perspective view of a portion of a slab block having certain of its faces relatively smooth and free from visible cellular formation and yet rough enough to easily take a coat of plaster; and Fig. 11 is a diagrammatic view illustrating a blast furnace and an associated car and ladle by which hot slag may be supplied to the mixing chamber of the apparatus. Throughout these views like characters refer to like parts.

In brief, the new process comprises bringing the molten slag from a blast furnace A, or other suitable source, for it is not so important just what kind of slag or slag-like material is used, to a combustion and mixing chamber B'. A ladle C is commonly used to convey the molten slag from the source of supply to the mixing chamber, although slag runners may be used if the chamber B' be located near the furnace. The molten slag is passed through the combustion and mixing chamber B' in a more or less continuous stream.

As the molten slag is about to enter the chamber B' it is supplied with a fuel or other combustion element fed into the stream from a fuel holder D', or fed by hand or otherwise as may be desired. The fuel ingredient E' thus delivered from the holder D' is preferably a comminuted fuel and it is directed into the molten slag stream near the inlet of the mixing chamber, that is to say, near the beginning of the path of the slag through the chamber. A common form of comminuted fuel obtainable where molten slag is usually produced as a more or less waste product, is pulverized coking coal or coke screenings. Such fuel will be found desirable for the purposes of the present invention.

The next step in the treatment of the advancing slag stream is the introduction and diffusion of oxygen or other combustion promoting element, preferably injected through a tuyère F' into the mixing chamber near its bottom. The fuel and oxygen are well mixed into the mass of molten slag and as they pass along with the same the fuel is more or less completely burned by reason of the presence of the oxygen and as a result a multiplicity of gas bubbles is formed by the combustion of the particles of fuel. Indeed, a high temperature is produced and this high temperature assists materially in gasifying the fuel particles so that the resulting gas and the supplied oxygen burn vigorously and at times more or less explosively. As the fuel particles travel upward through the molten slag the intermixture of bubbles and slag substances is promoted and the settling of liquid materials is largely prevented by utilizing the same in the building up of new bubbles. Any ash left from the fuel merely adds non-combustible material to the slag mass. Any excess air that may be supplied merely adds to the bubble content of the slag. Air or oxygen or other gas furnished through the tuyère F' may be supplied from any suitable source, as indicated by the compressed air tank G, the oxygen being obtained from the compressed air in case of such a supply.

The fuel E' may be, as before indicated, a comminuted fuel and the same may be supplied in briquetted dust, small sacks, or otherwise. Such packets E' may be injected into the slag stream by hand or carried by an elevator H associated with a supply hopper J.

As the bubbling mass passes out of the chamber B' it may be treated further to change its consistency and content. Thus, non-combustible material K' may be directed into the slag stream from a suitable holder or hopper L', or by hand or otherwise, as desired. Such material, where non-combustible, may be pulverized slag, pulverized limestone or the like. Where combustible, it may be any of the fuel materials herein mentioned.

In addition, the mass may be stirred at or near its point of delivery from the mixing chamber. A stirring device M may be provided for this purpose, or a certain amount of stirring may be done by hand. In some instances, stirring will be quite unnecessary, and instead of stirring, heating and other ways of treating the slag to bring about the desired changes in its constituent character may be resorted to. Obviously, the slag may be treated or not treated at this delivery point.

When the slag leaves the combustion and mixing chamber, it is in condition to be shaped and treated in accordance with the steps of the invention disclosed and claimed herein. To this end it is deposited upon a traveling conveyor P.

When deposited on the latter, it is suitably formed into an advancing slab web of definite cross-section. The ways of forming the section may vary. In the case illustrated, edge forming mechanism Q comprises edge engaging wheels which determine the width of the web and the shape of its edges, and then a transverse roller R determines the thickness of the web.

The roller R also bears a creasing bar and once per revolution this bar forms a crease in the upper face of the traveling slab. This means that the creases are formed at regular intervals. As the slab advances it cools and finally the end protrudes beyond the conveyor and ordinarily breaks off by reason of its own weight, although in some cases it may be broken off by the hand at the point indicated, or at some other point as desired. The pieces which are broken off are in the form of slabs or blocks S.

In order to facilitate the removal of the slag from the conveyor P, it is preferable to deposit sand or a like material upon the belt just before it encounters the slag. This material may be deposited by hand if desired, but preferably it is distributed over the belt by a sanding device U located just beneath the outlet of the mixing chamber and at the receiving end of the belt.

The blocks or slabs which are formed by breaking off the end of the continuous slab from time to time may be greatly varied in dimensions and formed to suit different classes of service. In Figs. 5, 6, and 7, narrow grooved blocks S' are shown. These represent slabs or blocks made in accordance with the method of the present invention. They have grooved edges and are provided variously with metal reinforcing bars and bars which form tongues for tongued and grooved building blocks. In addition, the blocks may be formed with tongues and grooves by the edging rollers. Such a block is the block $S^2$ of Fig. 9. A plain block without tongues or grooves may also be found.

In carrying out my invention, the slag which I employ may have a variety of compositions. It may be the ordinary blast furnace slag. Such slag will differ in the case of different blast furnaces. The differences in the different cases will result from the different kinds of ores and the different kinds of materials used in reducing them. The term "slag" may also be used to include mixtures and compositions which resemble slag in formation, thus various waste glass products may be mixed together in such a way as to form a bubbly mass of molten material and show a cellular structure when cooled. It is not intended to limit the present invention to the treatment of any particular kind of slag. Indeed, the term is to be used in a broad sense so as to include not only the available blast furnace slags and waste glass mixtures but all other slags and compositions which have the characteristics of slag.

Where the slag is furnished by a blast furnace A, it is drawn off through the usual "notch" or outlet 10 into ladles C. These ladles are presented one after the other at the blast furnace and filled with the slag. Ordinarily, they are carried to the filling point upon a car 11 although, in some instances, they might be presented at the filling point by a crane. One such car and, carrying a ladle, is shown in Fig. 11, positioned adjacent to the associated apparatus of Fig. 1. Whatever way is employed for filling the ladles C with slag, the ladles are ultimately raised by a crane and brought to a position above the mixing chamber B' and tilted so as to pour out the contents. In the drawings, crane connections 12 and 13 are shown. These particular slag handling devices form no part of the present invention and, therefore, need not be more fully disclosed.

The combustion and mixing chamber B' may obviously take different forms. It is desirable to confine the molten mass received from the ladles and treat it by supplying the combustion materials at the proper points and any suitable structure which will accomplish this will be satisfactory for carrying out the steps of the invention.

In the case illustrated, the mixer B' comprises an outer metal casing 40 and an inner structure of fire clay. The latter includes a bottom 41 of suitable thickness, a back 42, shown as of much greater thickness than the bottom, and a front 43, and sides 44 and 45, all of a thickness about the same as that of the bottom 41. There is also preferably an overhanging partition 46 of considerable thickness and irregular in contour. The fire clay structure provides a hopper 47 having a constricted throat or passage 48 and a lower basin 49. From the forward end of the latter there is an upwardly extending passage 50 which terminates in a downwardly extending spout 51 over which the mixed product passes on its way to the conveyor P. The upwardly extending passage 50 of the chamber B' is separated from a smaller chamber 52 just beneath the throat 48 by a depending lip 53. The space between the lower edge of the lip 53 and the bottom 41 provides a throat or constricted passage 54 through which all the material must pass in its journey through the mixer.

The tuyére F' is connected by pipes 55, 56, to a supply tank G which is adapted to contain air under pressure obtained from any suitable source. A control valve 57 is positioned in the pipe line and controls the amount of air delivered from the supply tank G to the tuyère F'. The latter opens into the lower pocket or basin 49 of the chamber B' and injects the air or other gas into the chamber along the bottom 41 so as to thoroughly encounter all of the material that has come into the mixer from the ladle C. The fact that the passageway 54 is a constricted passageway improves the operation of the mixer. It insures that the gas delivered by the tuyère will encounter directly or indirectly all the particles of fuel E' that have been delivered into the hopper 47.

It will be noted that the fuel in this instance is dropped into the hopper 47 and preferably at a point where it will fall toward the constricted opening 48. If the fuel packets E', as before, are made up of masses of comminuted fuel, then it will be obvious that as soon as they pass into the molten mass within the hopper the packets will be broken up and the various particles of fuel will be well distributed through the adjacent non-combustible material. The fact that the molten mass must pass through the constricted channel 48 and at that time hold the fuel which has been thrown into the hopper, insures a good mixture of the non-combustible slag and the combustible fuel as the same passes down into the smaller chamber 52 in which it begins to encounter the supply of gases from the tuyère.

Obviously as the mixture of combustible and non-combustible material passes downward and on through the constricted passage 54, it will be acted upon by the oxygen of the supply through the tuyère and combustion will result. The latter will occur wherever there is a particle of fuel, and wherever it does occur there will result a multiplicity of gaseous bubbles which will increase the foam structure of the mass. As the intermingled oxygen and fuel and non-combustible slag material rises through the passage 50, the combustion can proceed at all points and there will be, by reason of the vertically upward flow, a greater possibility of all liquid material being intermingled with the bubbles and therefore used up in making the foam structure which is desired as the product of the process.

As before suggested, the combustion raises the temperature of the hot slag and lessens the viscosity, thereby promoting the formation of the foam mixture. The length and rise of the passage or chamber 50 in which so great combustion takes place, are gauged to suit the viscosity that may be desired, the longer the chamber the greater the puffing up of the slag and the greater the certainty it will arrive at the desired mixture.

As before indicated, the hopper L' and the associated chute 60 may be used for the delivery of combustible and non-combustible material K' into the outlet spout of the hopper B'. In this way the character of the product issuing from the mixer may be to a certain extent controlled.

The hopper B' in the embodiment illustrated is carried upon channel irons 61 supported by suitable posts 62, 63, 64, 65. These, in turn, rest upon a concrete foundation 66 upon the ground 67. The foundation 66 is provided with a pit 68 below the outlet 69 of the mixer B'. The purpose of the pit is to receive in a bath of water the contents of the mixer when the latter is dumped by opening the stopper valve 70 which normally closes the opening 69. The passage of the slag into the water breaks up or granulates the slag and then it can be shoveled easily from the pit. The stopper 70 is normally held in closed position by a series of weights 71 positioned on the free end of the supporting arm 72 which is pivoted to the structure at an intermediate point 73 and has an upturned end which is secured loosely to the stopper 70.

Granulated slag, produced as just stated or otherwise, may be used as one of the non-combustible materials K' delivered into the outlet spout of the hopper B'. Being non-combustible it tends to cool the mass. But it should be understood that the cooling effect may be produced in other ways.

The fuel packets E', as before indicated, may be fed into the mixing chamber B' in any suitable way. If desired, this can be done by hand. It is preferred, however, to employ some mechanism for doing this at a regular rate. For this purpose in the embodiment in question a hopper 76 is located near the receiving mouth of the mixer B' but preferably a little to one side of the same so as to not interfere with the emptying of the slag from the ladles into the mixer. A trough 77 leads from the lower end of the hopper 76 and its open end is directly above the mouth 47 of the mixer. Fuel deposited in the hopper at regular intervals will pass down through the spout 77 and drop into the hopper 47 in line with the constricted throat 48 of the same.

For the purpose of feeding the fuel to the hopper 76 in proper quantities and at a proper rate, the elevator H is employed. This includes a belt 78 traveling over suitable wheels 79, 80, properly journaled in a supporting frame 81 carried upon uprights 82, 83, extending upward from the foundation 66.

The conveyor H may be driven in any suitable way as by an electric motor 84 mounted upon the foundation 66 adjacent to the lower end of the conveyor. A belt 85 transmits power from the shaft of the motor to the pulley on the shaft of the lower wheel 80. The belt 78 carries flights 86 or other suitable devices for receiving and holding the packets E' of fuel which are arranged to drop from a hopper 86 of the mechanism J at suited intervals. The hopper J is carried in any suitable way, as by means of the uprights 87. In this particular instance no special means is shown for feeding the packages E' from the hopper 86 in timed relation with the travel of the belt 78 but obviously this might be done by controlling the outlet of the hopper 86 by hand or other suitable mechanism that would insure the deposit of the requisite number of packets, one or more, upon each flight 86.

As the molten mass passes over the delivery lip 51 of the mixer B', it is also moved in a more or less vertical direction and this assists, as it did in the upward movement of the mass through the channel 50, in equalizing the distribution of the gaseous bubbles in the mass which is on its way to the conveyor P. Any combustion which may take place at this time will thus more evenly distribute the bubbles than if the direction of travel were more nearly horizontal. The result of this even distribution of the bubbles throughout the mass is a more uniform cellular structure in the product.

To further assist in fixing the character of the ultimate product it may be desirable in some instances to agitate the mass just after it leaves the mixer B' and just as it enters upon the conveyor P. Obviously a hand stirring device or tool might be used for this purpose. It is, however, preferable to employ some mechanical stirrer. Such mechanism is the stirring mechanism M. The latter includes a pair of vertical shafts 90 with stirring blades 91 at their lower ends. These shafts are suitably journaled in bearings 92 carried by a suitable frame member 93. For the purpose of rotating the shafts they are provided with bevel gear wheels 94 which cooperate with bevel gear wheels 95 carried by a horizontal shaft 96. The latter is suitably journaled in bearings 97 upon the frame member 93. The shaft 96 is extended and carries at its outer end a free running pulley 98 to which it may be secured at will by an associated clutch 99. The pulley 98 is suitably driven through a belt 100. Whenever it is desired to use a stirring device the clutch 99 is operated so as to connect the driving pulley 98 to the shaft 96. Whenever it is necessary to stop the stirring, then the clutch 99 is thrown in the opposite direction to disconnect the pulley 98 from the shaft 96.

The conveyor belt P extends substantially horizontally and travels over end rollers 103, 104, suitably journaled in bearings carried by pedestals 105, 106, which find their support in the foundation 66. The upper stretch of the belt P travels over guides 107 and rather closely engages them. The guides 107 are supported by suitable legs 108, 109, cross members 110 and longitudinal bracing members 111. The legs in this case rest also upon the foundation 66. As shown, the receiving end of the belt P is located well beneath the spout 51 of the mixing chamber B'. The belt is in the present instance shown as driven by an electric motor 112 which operates through a belt 113 upon a driving pulley 114 upon the shaft of the roller 104. The direction of travel of the belt is such that its upper strand travels outward away from the chamber B'.

In order that the slag material may not stick to the surface of the belt P, some separating material such as sand or granulated slag or glass should be thrown upon the surface of the belt at the receiving end of its upper stretch. As before indicated, this may be done by hand, but preferably some mechanism is employed for the purpose. In the present instances, a distributor such as shown more particularly in Fig. 4 is employed.

This distributor U includes a cylindrical casing 118 having in its lower side adjacent to the belt P a series of perforations 119. Through the center of this casing 118 extends a shaft 120. This shaft carries a spiral conveyor 121 which travels so as to carry material from right to left, as the parts are shown in Fig. 4. The receiving end of the sander is provided with a hopper 121a into which the material which is to be used as the separating material upon the conveyor may be deposited. An outlet 122 is controlled in size by a slide 123. In this way the amount of granulated material which passes into the cylinder 118 may be regulated and the movement of the conveyor 121 will carry the same through the cylinder and it will pass out through the perforations 119 on to the upper surface of the upper stretch of the conveyor P. The spiral conveyor 121 is driven through the agency of a pulley 124 on the shaft 120 driven by a belt 125 extending over the driving pulley 126 of an electric motor 127 suitably supported on the foundation 66.

The mass of slag, as it passes out upon the conveyor P, is in a foamy plastic condition and capable of being molded and shaped into a suitable slab which advances continuously. For the purpose of restricting the slab to a proper width, a pair of edging rollers is mounted to rotate in the plane of the advancing slag strip. The edge rollers may be differently formed so as to produce different edge formations upon the slab. Thus, the edge rollers 128 of Fig. 3 are provided with peripheral ribs 129. These ribs operate upon the viscous slag material to restrict it to a given width and also to provide both edges with grooves 130, as illustrated in Fig. 5, for example.

In lieu of the grooving rollers 128, it is possible to substitute for one of the rollers 128 a roller 128a provided with a groove 129a. In such case a slab is provided with a regular tongue and groove as illustrated in the piece between the edge wheels in Fig. 8. A similar product is the block $S^2$ of Fig. 9.

These edge rollers, whichever pair is used, are mounted, as illustrated more particularly in the case of the rollers 128, upon vertical shafts 131 journaled in suitable arms 132 upon pedestals 133 carried by the foundation 66. Bevel wheels 134, 135 upon the shafts 131 and a common driving shaft 136 cooperate in driving the edge rollers from the shaft 136. The latter, as shown is suitably journaled in bearings in uprights 137 upon the standards 133. The shaft 136 is provided at one end with a driving pulley 138 which is driven through the agency of a belt 139 from the pulley 140 of an electric motor 141. Obviously other ways of driving the edge rollers may be employed but the way shown will suffice for the present disclosure.

At this point it may be noted that the belt 100 which drives the pulley 98 upon the driving shaft of the stirring mechanism M, is driven from a pulley 142 mounted upon the shaft 136 alongside of the pulley 138. Thus both stirring mechanism M and edging mechanism Q are operated from the same driving motor 141.

The element which controls the thickness of the slab is located nearer the outlet of the mixer B' than are the edging rolls 128. This element is in the present embodiment the roller R, previously mentioned. This roller is journaled at its ends in suitable bearings 145 mounted upon suitable standards 146 resting upon the base 66. This roller R is cylindrical and spaced far enough away from the upper stretch of the belt P to give the required slab thickness.

At one point in its periphery the roller R is provided with a longitudinal rib 147. This rib by encountering the slag material at regular intervals produces a crease or groove 148 which extends transversely of the slag. These grooves 148 occur at regular intervals and the diameter of the roller R is chosen with a view to fixing the distance between successive grooves. Obviously, instead of producing the creases 148 by the rib 147 on the gauging roller R, the creases might be made upon the slab web by any suitable tool, operated either by hand or mechanism.

The driving shaft 149 of the roller R is provided at one end with a driving pulley 150. This pulley may be driven in any suitable way, as by means of the belt 151 which passes over a driving pulley 152 located at the end of a shaft 153 suitably journaled in bearings at the upper ends of standards 154. The shaft 153 is driven in turn by a belt 155 which engages cooperating pulleys 156 and 157 on the shaft 153 and the shaft of the driving motor 141, respectively.

The shaft 153 carries a roller 158 which is provided with a number of rows of teeth 159. These teeth come close to the surface of the slab strip and comb the surface. The result of this power combing of the surface is to break down the outer walls of the cells along the top of the strip and cause the same to more or less close over the various cellular openings and thus provide a kind of roughness at the outer surface of the slab, well suited to receive and hold a coat of plaster or the like. Obviously, this combing may be done in longitudinal strips by providing the teeth 159 in groups along the roller 158. Again, the combing may be done by any suitable tool operated by hand or by other mechanism than shown.

It will be seen that as the slab web is advanced by the conveyor P it will gradually cool and the formed slab will retain its shape in cross-section. The length of the belt may be made such that the slab will be sufficiently cool by the time the delivery end of the conveyor is reached, that the protruding end of the web will break off along the line of the nearest crease 148 and thus produce a series of slabs S, which are indicated particularly in Fig. 1 as carried upon a car 162 having wheels 163 traveling on suitable track rails 164, in this instance resting upon the foundation 66. Thus, the treating of the mass by the stirring mechanism M, the creasing or otherwise marking of the same by the roller R and the shaping of the edges by the edging mechanism Q all occur while the foam mass is still plastic, while the final breaking off at the end of the conveyor P after the mass has become cool enough to be fragile and readily breakable along the creased lines.

As previously indicated, the resulting product is a series of slabs of cellular formation having plain or variously shaped edges. Thus, there may be grooves 130 in each of the edges; or, if desired, a groove 130 may be placed in one edge and a tongue 160 upon the other edge. Still other edge formations may be provided.

In furtherance of the invention, the double grooved slab or block S' may be used to build up a tongue and groove structure by placing in one of the grooves a projecting strip 165 which will project far enough beyond the edge to form a tongue adapted to fit into the groove 130 of a like tongued and grooved block. This is the structure particularly illustrated in Fig. 6.

Instead of putting strips of this kind into the groove, it may be desirable for some building purposes to reinforce the block. In such case, metal bars or rods 166 are placed in the respective grooves 130, and when pressed against the bottoms of the same, a filling of cement 167, or other like material, is employed to enclose and firmly hold the reinforcing rods. This is a structure more particularly shown in Fig. 7.

As shown in Fig. 10 and in other figures too, the exterior surfaces 204, 205 of a product block close over the main cells of the foam structure and where the end is cut off or broken off, the cells are left exposed for finishing or coating or other treatment, as desired. Where the closed over surfaces 204, 205 are desired, it is only necessary to roll or otherwise similarly treat the surface of the slag as it passes along in the course of manufacturing the slabs. This rolling operation smooths down the cells near the surface and allows the contained bubbles to elongate and the adjacent walls to run together to provide the outside skin which makes the finished surfaces 204, 205.

From what has been said it will be seen that the invention and the apparatus for putting it into practice may be varied considerably to suit different conditions and requirements of service and of the product to be produced.

Thus it will be obvious that the roller R which determines the thickness of the slab on its passage from the mixer B' may be shifted up or down to vary the thickness of the slab. The roller R might also be given a different diameter to vary the length of the slab. The same result might be had in other instances by giving a roller R of given diameter a different number of creasing bars 147. If the roller R is to be vertically adjustable then it can be made so in the same manner as the upper roll of a two high mill is made adjustable. Such constructions are well known and need not be illustrated.

Obviously too, the edging rollers 128, 128a, 129 may be varied in position in order to produce different widths of slabs. This can be done by adjusting one or both of the rollers horizontally toward and from each other like the edging rollers of a universal mill. Again, the edges of these rollers may themselves be varied to provide various shaped designed to interfit with each other or otherwise, as desired.

It will also be apparent that in carrying out the steps of the present invention and producing the product herein disclosed, there may be many other alterations and modifications in the specific matters recited than those particularly mentioned, and yet the spirit and scope of the invention be not departed from. I therefore do not wish to be limited to the precise matters disclosed, but aim to cover by the terms of the appended claims all those alterations and modifications which rightly come within the purview of the invention.

I claim:

1. In a process of the kind described, the operations of delivering a stream of hot bubbly material of the kind described upon a continuously traveling conveyor and subjecting the same while on the conveyor to a cooling action, whereby the material on the conveyor at any given instant constitutes a traveling mass which is in a semi-molten plastic state at the receiving point and gradually cooler down to the delivery point where it is cooled to solidity, accompanied by the application of rolling pressure to the hot mass near said receiving point to smooth down the cells near the surface of the material and allow the contained bubbles to elongate and the adjacent walls to run together to provide an outside skin, and subsequently raking the outside surface thus formed after the same has been somewhat cooled but before it reaches its fully cooled state to break down the outer cell walls and permit the material more or less to close over the various cellular openings and thus provide a roughness upon the product surface well suited to receive a coat of plaster or the like.

2. In a process of the kind described, the operations of delivering a stream of hot bubbly material of the kind described upon a continuously traveling conveyor and subjecting the same while on the conveyor to a cooling action whereby the material on the conveyor at any given instant constitutes a traveling mass which is in a semi-molten plastic state at the receiving point and progressively cooler down to the delivery point where it is cooled to solidity, accompanied by the operations of pressing the material of the stream at a point where it is semi-molten into a slab-like stream of given cross section and of raking the surface thus formed at a point where the material is somewhat cooled but before it reaches its fully cooled state to break down its outer cell walls and bring about a modified surface in the product when cooled to solidity.

3. In a process of the kind described, the operations of projecting a mass of hot bubbly material of the kind described outward upon a support in a flat advancing stream, allowing the stream to cool as it advances, thus providing at any given instant a length of material of varying temperatures ranging from that of the hot plastic mass at one end progressively down through lower temperatures to that of the cooled solid product at the other end, and raking the surface of the stream at an intermediate point in said length to break down the previously formed cell walls and thus produce a roughened surface in the finished cooled product.

WILLIAM C. CORYELL.